(12) United States Patent
Narayanan et al.

(10) Patent No.: US 8,572,218 B2
(45) Date of Patent: Oct. 29, 2013

(54) TRANSPORT DATA COMPRESSION BASED ON AN ENCODING DICTIONARY PATCH

(75) Inventors: Hariharan L. Narayanan, Tamil Nadu (IN); Arun Ramakrishnan, Tamil Nadu (IN); Krishna C. Shastry, Dakshina Kannada (IN); Rohit Shetty, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/634,743

(22) Filed: Dec. 10, 2009

(65) Prior Publication Data

US 2011/0145313 A1 Jun. 16, 2011

(51) Int. Cl.
*G06F 15/16* (2006.01)

(52) U.S. Cl.
USPC .............................. 709/220; 709/247; 341/106

(58) Field of Classification Search
USPC ..................... 709/203, 220; 341/106; 707/693
See application file for complete search history.

(56) References Cited

U.S. PATENT DOCUMENTS

| | | | | |
|---|---|---|---|---|
| 6,067,381 | A * | 5/2000 | Benayoun et al. | 382/232 |
| 6,529,912 | B2 * | 3/2003 | Satoh et al. | 707/693 |
| 6,883,035 | B2 * | 4/2005 | Hannu et al. | 709/247 |
| 6,963,587 | B2 | 11/2005 | Hannu et al. | |
| 7,348,904 | B2 * | 3/2008 | Christoffersson et al. | 341/106 |

OTHER PUBLICATIONS

"Binary delta compression", http://en.wikipedia.org/wiki/Binary_delta_compression, retrieved Dec. 11, 2012, 12 pages.
"Delta Compression", IBM Research—Almaden, http://www.almaden.ibm.com/projects/delta_compression.shtml, retrieved Dec. 11, 2012, 1 page.
"Delta encoding", http://en.wikipedia.org/wiki/Delta_encoding, retrieved Dec. 11, 2012, 5 pages.
"Huffman coding", http://en.wikipedia.org/wiki/Huffman_encoding, retrieved Dec. 11, 2012, 10 pages.
Deutsch, P., "DEFLATE Compressed Data Format Specification version 1.3", http://www.http-compression.com/rfc1951.txt, May 1996, 16 pages.

(Continued)

*Primary Examiner* — Tammy Nguyen
(74) *Attorney, Agent, or Firm* — Stephen R. Tkacs; Stephen J. Walder, Jr.; Libby Z. Toub (57) ABSTRACT

A method and system for transport data compression between a server and a client based on patches to the dictionaries used for encoding the data. The method includes requesting the server for data, returning the data and a dictionary patch to the client where data having been compressed based on a previously used dictionary and the dictionary patch, and decompressing the returned data using the dictionary and the dictionary patch. The dictionary patch includes updates to the previously used dictionary. Each dictionary has a dictionary identifier that the server and client use to identify the dictionary in their requests and responses. The identifier might be a unique identification or a network session number. Upon receiving a response, the client updates the previously used dictionary with information in the patch and decompresses the returned data using the updated dictionary.

25 Claims, 7 Drawing Sheets

(56) References Cited

OTHER PUBLICATIONS

Deutsch, P., "GZIP file format specification version 4.3", http://www.http-compression.com/rfc1952.txt, retrieved Dec. 11, 2012, 12 pages.

Hargreaves, Shawn, "Network compression", http://blogs.msdn.com/shawnhar/archive/2007/12/22/network-compression.aspx, Dec. 22, 2007, 1 page.

Korn, D. et al., "The VCDIFF Generic Differencing and Compression Data Format", http://tools.ietf.org/html/rfc3284, Jun. 2002, 29 pages.

Rack, Constantin, "HTTP Compression", http://www.http-compression.com/, retrieved Dec. 11, 2012, 5 pages.

Suel, Torsten et al., "Algorithms for Delta Compression and Remote File Synchronization", http://cis.poly.edu/suel/papers/delta.pdf, retrieved Dec. 11, 2012, 24 pages.

* cited by examiner

TRANSPORT DATA COMPRESSION BASED ON AN ENCODING DICTIONARY PATCH

FIELD OF THE INVENTION

The invention relates generally to data compression, and more particularly, to a method and system for compressing network transport data between two computers based on an encoding dictionary patch.

BACKGROUND

Data compression for network data transfer is necessary in order to reduce the amount data transferred over the network. The data compression improves network response time and allows the network to accommodate a larger amount of data over the same network infrastructure.

A number of data compression methods are in use today for networks such as "deflate" and "gzip". Most standard compression techniques work on the basis of a code table or dictionary used to map codes to characters. The well-established lossless data compression methods are broadly grouped as "dictionary" and "entropy encoding" compression.

Dictionary encoding techniques such as the Lempel-Ziv family of algorithms maintain a dictionary of symbol-to-data mappings. Portions of the data to be compressed that match entries in the dictionary are replaced by the symbols. These dictionaries may be built statically and used to encode data, or dynamically, where during the encoding process the dictionary is updated and optimized.

Entropy encoding algorithms, like the Huffman Coding technique, build variable-length codes which replace portions of the data to be compressed. This is optimized by ensuring the most frequently occurring patterns of data are substituted by the shortest codes. For example, if the single characters are replaced with the codes, then the space or 'e' character is likely to be replaced with the shortest code in the code set. These code-to-data mappings are stored in a code-table or dictionary. The Huffman Coding technique uses a tree data structure to represent this dictionary.

While sending compressed data over a network, each chunk of data is compressed and sent along with a dictionary. During a network session or conversation, each chunk of compressed data that is transmitted contains its own unique dictionary which will be used during decompression. Quite often the session involves the transfer of a number of similar chunks of information. For example, a web browser surfing a website is likely to download a number of similar pages. In fact, any structured data such as html and xml would likely contain a lot of similar contents. This however is not limited to just web browsing, but can be extended to any situation where there is a session-based transfer of compressed data over a network.

As an example, consider the data in a group of html pages being compressed and downloaded. It is quite likely that the html tags such as table tags would be entries in the dictionary. After the first chunk of compressed data is downloaded to a browser, the subsequent data chunks are likely to contain similar entries in the dictionaries for html tags and other commonly occurring sets of information. As a result, a significant number of chunks of compressed information have very similar or even identical dictionaries.

In a session environment where a client computer is able to maintain a state or context, the repetitive dictionary entries become redundant. Current network data transport techniques do not take advantage of such redundant data and network session features in optimizing the data encoding during the transfer of data.

Accordingly, it is appreciated that there exists a need for a method and system for transport data compression that optimizes performance based on the redundant transferred data and network session characteristics.

SUMMARY

The present invention relates to a method and system for network transport data compression based on patches to the dictionaries used to encode data transfers between two computers. The invention optimizes current dictionary and codetable based encoding techniques by using network session features to reduce the amount of data being processed and transferred over the network. Using the data transfer between a client and server as an example, an embodiment of the method of the invention includes requesting the server for data and returning the data and a dictionary patch to the client, where the data has been compressed based on a previously used dictionary and the dictionary patch. The method further includes the step of decompressing the returned data using the dictionary and the dictionary patch.

The dictionary patch includes updates to the previously used dictionary. Each dictionary is associated with a dictionary identifier which the server and the client use to identify the dictionary in their communication with each other. The dictionary identifier is returned to the client, together with the compressed data and the dictionary patch. The dictionary identifier might be a network session identification, if the network protocol has network session support capability, or a unique identification created by the server. Upon receiving a response from the server, the client updates the previously used dictionary with information in the dictionary patch and decompresses the returned data using the updated dictionary.

The server returns a new dictionary with the compressed data if the data request had no reference to a previously used dictionary. The server's response further includes a flag to indicate that a new dictionary is being sent to the client. Each dictionary is associated with an expiration time. In requesting a subsequent chunk of data, the client identifies the previously used dictionary in the data request if the dictionary is still valid. When processing a client's data request, the server determines whether the dictionary is still valid based on the expiration time of the dictionary. If the previously used dictionary that was referred to in the request is no longer valid, then the server returns a new dictionary with the compressed data. The server also returns a new dictionary with the compressed data if the new dictionary is significantly different from the previously used dictionary. Upon receiving a server's response, the client replaces the previously used dictionary with the new dictionary if a new dictionary was returned.

In another aspect of the invention, a system for network transport data compression between a server and a client is disclosed. The system includes computer logic in the client for requesting data from the server, computer logic in the server for returning the data and a dictionary patch to the client, where the data has been compressed based on a previously used dictionary and the dictionary patch, and computer logic in the server for decompressing the returned data using the dictionary and the dictionary patch. The dictionary patch includes updates to the previously used dictionary.

In still another aspect of the invention, a computer program product for network transport data compression between a server and a client is described. The product includes a computer usable storage medium having program code operable to request data from the server, return the data and a dictionary patch to the client, where the data has been compressed based on a previously used dictionary and the dictionary patch, and decompress the returned data using the dictionary and dictionary patch.

Further details of the present invention, both as to its structure and operation, are described below in the Detailed Description section in reference to the accompanying drawings, in which like reference numerals refer to like parts. This Summary is intended to identify key features of the claimed subject matter, but it is not intended to be used to limit the scope of the claimed subject matter.

DETAILED DESCRIPTION OF THE INVENTION

The invention relates generally to data compression. More specifically, the present invention provides a method and system for network transport data compression based on updates to the encoding dictionaries used for compressing and decompressing the transport data between two computers.

As will be appreciated by one skilled in the art, the present invention may be embodied as a method, system or computer program product. Accordingly, the present invention may take the form of an entirely software embodiment (including firmware, resident software, micro-code, etc.), an entirely hardware embodiment, or an embodiment of any combination of software and hardware computer logic components to provide the described functions. Furthermore, the present invention may take the form of a computer program product embodied in any tangible medium of expression having computer-usable program code embodied in the medium.

Any combination of one or more computer usable or computer readable media may be utilized. The computer-usable or computer-readable media may be, for example but not limited to, electronic, magnetic, optical, electromagnetic, infrared, or semiconductor system, apparatus, device, or propagation medium. An example of a computer-readable medium is a hard disk drive.

The invention provides an improvement to dictionary and code-table based encoding techniques while transferring data over a network in a session environment. Data compression processes provide lossless compression with very high compression ratios. The method and system of the invention, for network data compression between two computers such as a client and a server, reduce network traffic by eliminating redundant data transfer. In a typical sequence of network data transfers, subsequent chunks of compressed data contain very similar dictionaries. This redundant transfer can be eliminated by transferring "patches" to the dictionaries instead of transferring the dictionaries in their entirety.

For the purpose of clarity, a "client" computer refers to the requester of the compressed data and a "server" computer refers to the data compressor (or data encoder) and sender of the compressed information. A client makes a request for some data from a server and indicates that encoding (or data compression) is supported. The server receives this data request and performs the data compression. During the compression process, the server creates a code-to-data dictionary and sends it to the client along with the compressed information. The client is able to decompress the data and then process it as may be required, using the code-to-data dictionary.

At this point, the client and server have identical copies of the dictionary used for the first chunk of data. When a subsequent request is made by the client, the server can now use the previous dictionary to compress the next chunk of data, with the knowledge that the client has the same dictionary.

The server does not need to create a dictionary from scratch but can instead use the old dictionary as a base, thus reducing the amount of data to be processed and improving its response time.

It is likely that during the compression process, the dictionary needs to be modified and adapted to the new data being processed by the server computer. In that case, the server keeps track of the modifications to the dictionary that is being used for compressing the current chunk of data. These dictionary updates are stored in a dictionary "patch" which can then be sent to the client along with the compressed data.

When the client receives a response from the server, it updates the dictionary referred to in the response with information in the returned dictionary patch. This process synchronizes the client's copy of the referenced encoding dictionary with that of the server's. The compressed data in the server's response can now be decompressed and used by the client.

In order to maintain consistency and to handle error situations, the encoding dictionary needs to be tagged by the server with a unique identification. This identification could be generated in two ways. In one preferred embodiment of the invention, the server creates a unique identifier for the dictionary in particular. In another embodiment of the invention, a network session identifier might be used to identify a dictionary if the underling network protocol supports network sessions.

The dictionary identifier is sent by the server in its initial response to the client. This identifier will also be used in further communications between the client and the server. Such a process allows the client and server to handle dictionaries and their validity in and across their network data transport sessions. The transmission of redundant entries in a dictionary is avoided and in the ideal case, the transmission of the contents in a dictionary could be entirely eliminated. As a result, response times to a client computer are improved and the amount of data sent over the network is drastically reduced.

Referring now to the drawings, in which like numerals represent like elements, aspects of the present invention and exemplary operating environments will be described.

Figure 1:
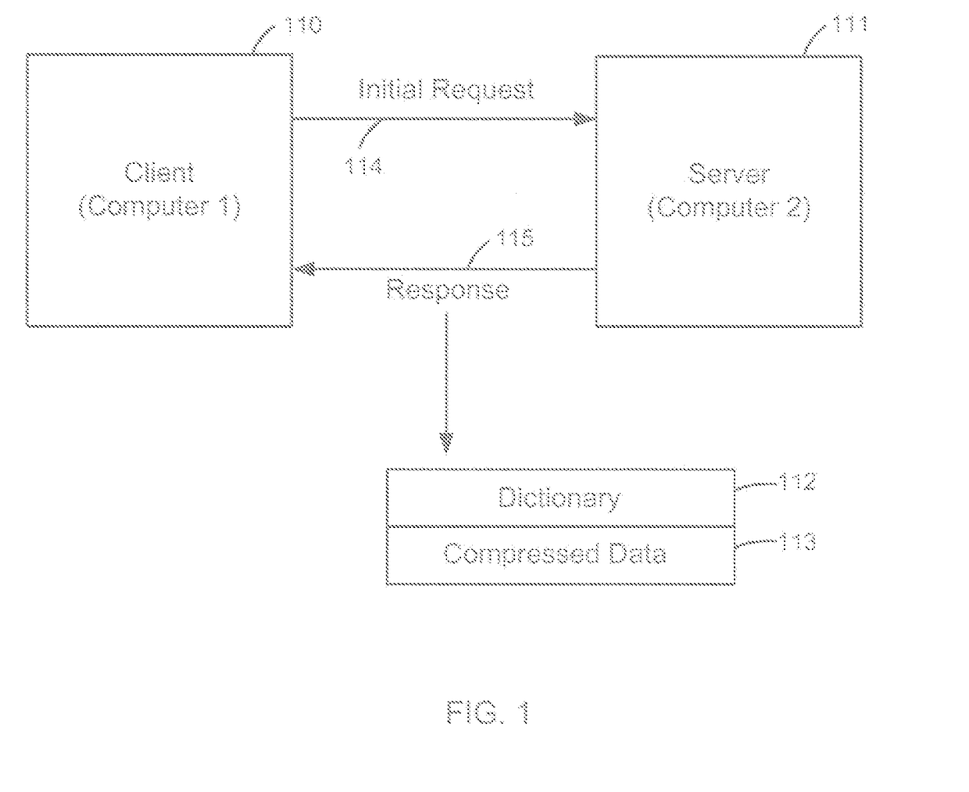
FIG. 1 is a block diagram illustrating an initial request for data from a client and a response from a server that includes an encoding dictionary and the compressed data, in which aspects of the invention are applicable.

FIG. 1 is a block diagram illustrating an initial request for data from a client computer and a response from a server computer in which aspects of the might be applied. The initial request 114 is from a client 110 to a server 111. The response 115 is from the server 111 to the client 110. The response 115 includes a dictionary 112 and compressed data 113. The dictionary 112 was used by the server 111 to encode (or compress) the data requested by the client 110. The dictionary 112 is preferably identified by an identifier that has been generated by the server 111. As described above, the dictionary identifier might be a unique identification created by the server 111 or a network session identifier if the underling network protocol supports the network sessions between the client 110 and server 111.

Figure 2:
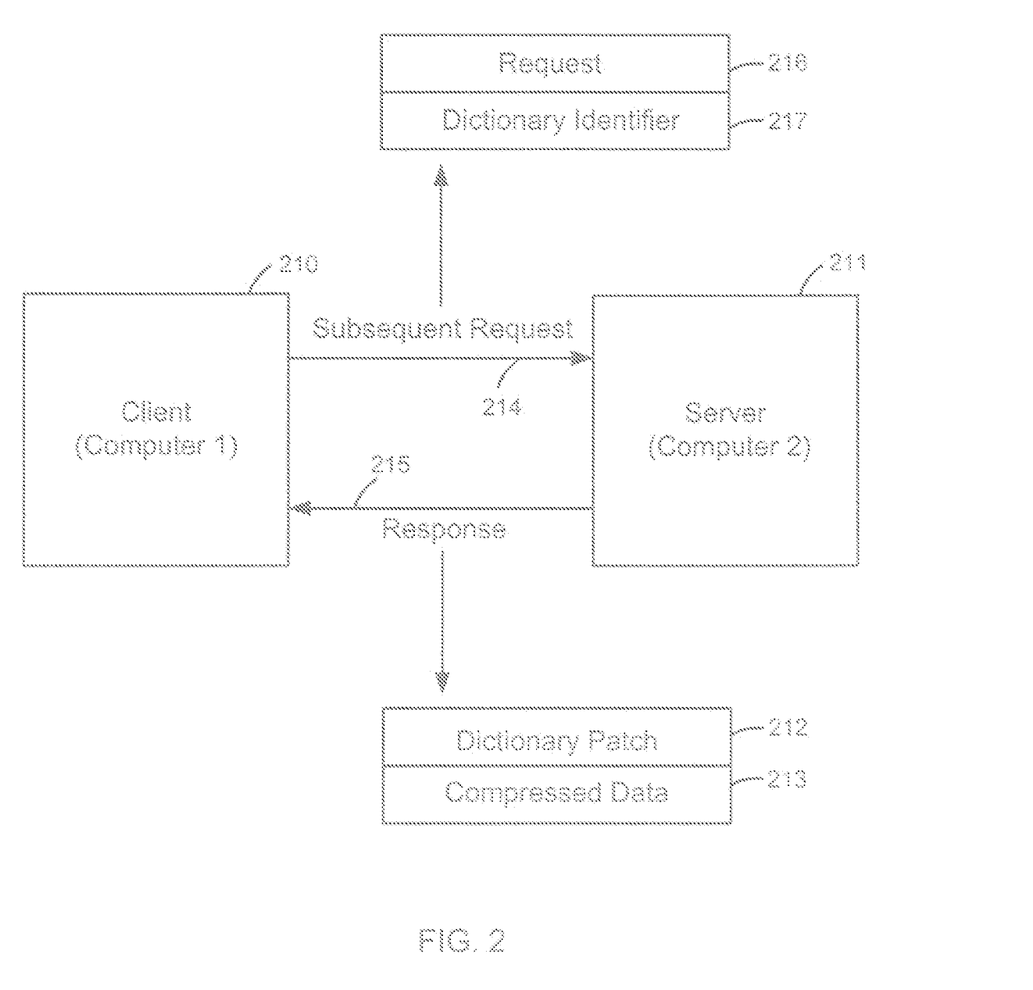
FIG. 2 is a diagram illustrating a subsequent request for data from the client and a response from the server that includes a dictionary patch and the compressed data according to aspects of the invention.

FIG. 2 is a block diagram illustrating a subsequent request 214 for data from the client computer 210 and a response 215 from the server computer 211 according to aspects of the invention. The subsequent data request 214 includes a request 216 for data and a dictionary identifier 217. The identifier 217 is associated with the dictionary that was used by the server 211 to compress the most recent chunk of data from the server 211. The dictionary identifier 217 was generated by the server 211 and returned to the client 210 in its response to the last data request from the client 210. The response 215 includes a dictionary patch 212 and requested data 213. The requested data 213 has been compressed by the server 211 using the dictionary associated with the dictionary identifier 217 and dictionary patch 212. The dictionary patch 212 contain updates to this dictionary such as instructions to add a new entry to the dictionary, to modify an existing entry or to remove an entry from the dictionary.

Figure 3:
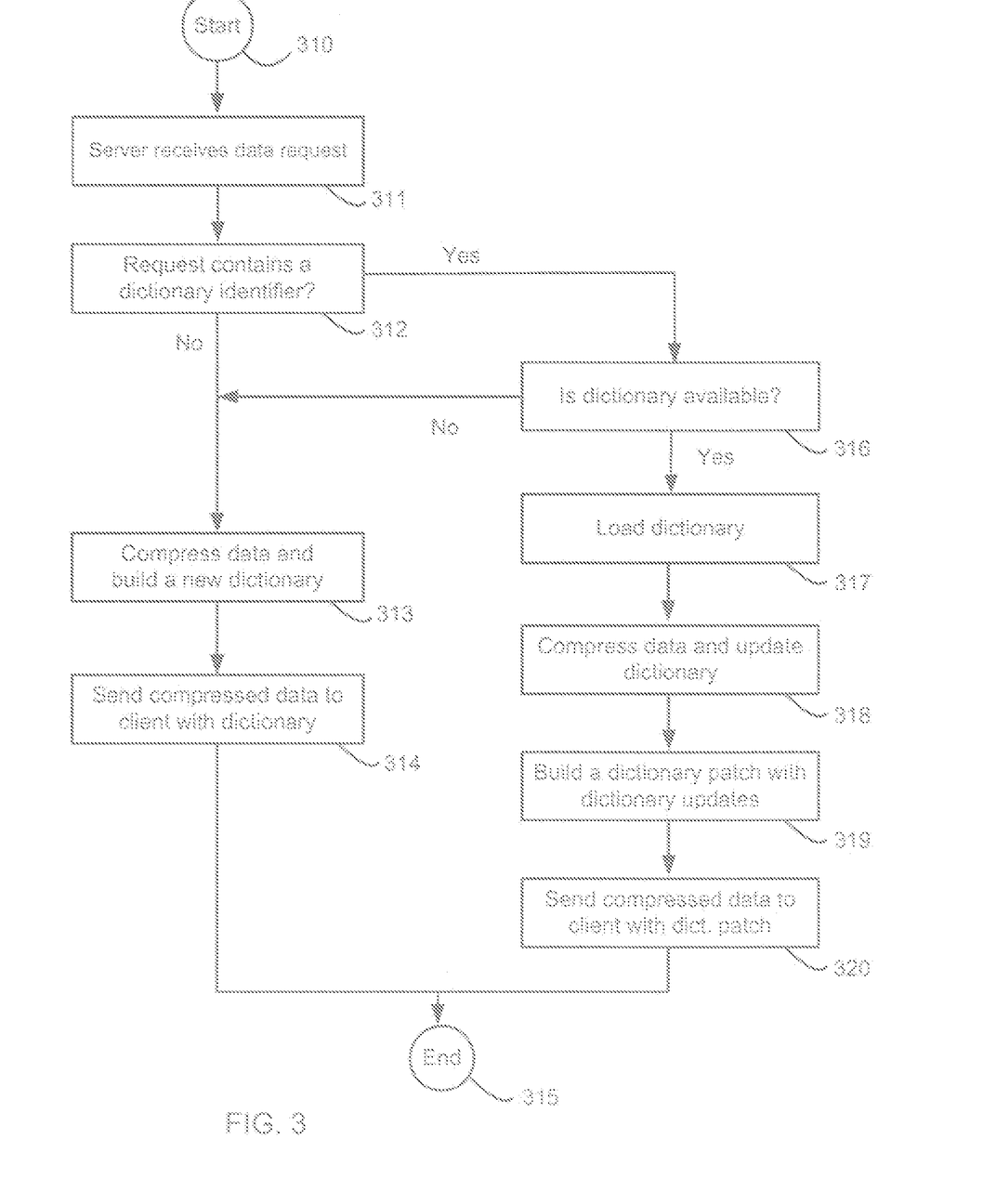
FIG. 3 is a flow chart representing a preferred method for processing a client's request for data and encoding the requested data by the server according to aspects of the invention.

FIG. 3 is a flow chart representing a preferred method on the server's side for processing a client's request for data and encoding the requested data, according to aspects of the invention. The server's processing starts at block 310. At block 311, the server receives a data request from a client. The server determines whether the request contains a dictionary identifier at block 312. If the request has no reference to a previously used dictionary, then the server compresses the requested data and builds a new dictionary at block 313. At block 314, the server returns the compressed data and the dictionary to the client. The server's processing of the data requests ends at block 315.

If the client's data request contains a dictionary identifier, which is the identifier for the dictionary used in the last data compression returned by the server, as determined at block 312, then the process continues at block 316. The server determines whether the dictionary associated with the identifier is still available or valid. The validity of a dictionary might be based on a time stamp associated with each dictionary. The embodiments of the invention preferably include an expiration time for each dictionary when the server sends the dictionary to the client. Further details of the expiration time and its use in the preferred embodiments of the invention are described below in reference to FIGS. 5-7.

If the dictionary referenced in the data request is still valid when the server processes the request, then the server loads the dictionary into the server's memory at block 317. The server then compresses the requested data with the dictionary and updates the dictionary as needed at block 318. The server also builds a patch that contains the updates to the dictionary, at block 319. At block 320, the server returns the compressed data and the dictionary patch to the client. The server's process terminates at block 315.

Figure 4:
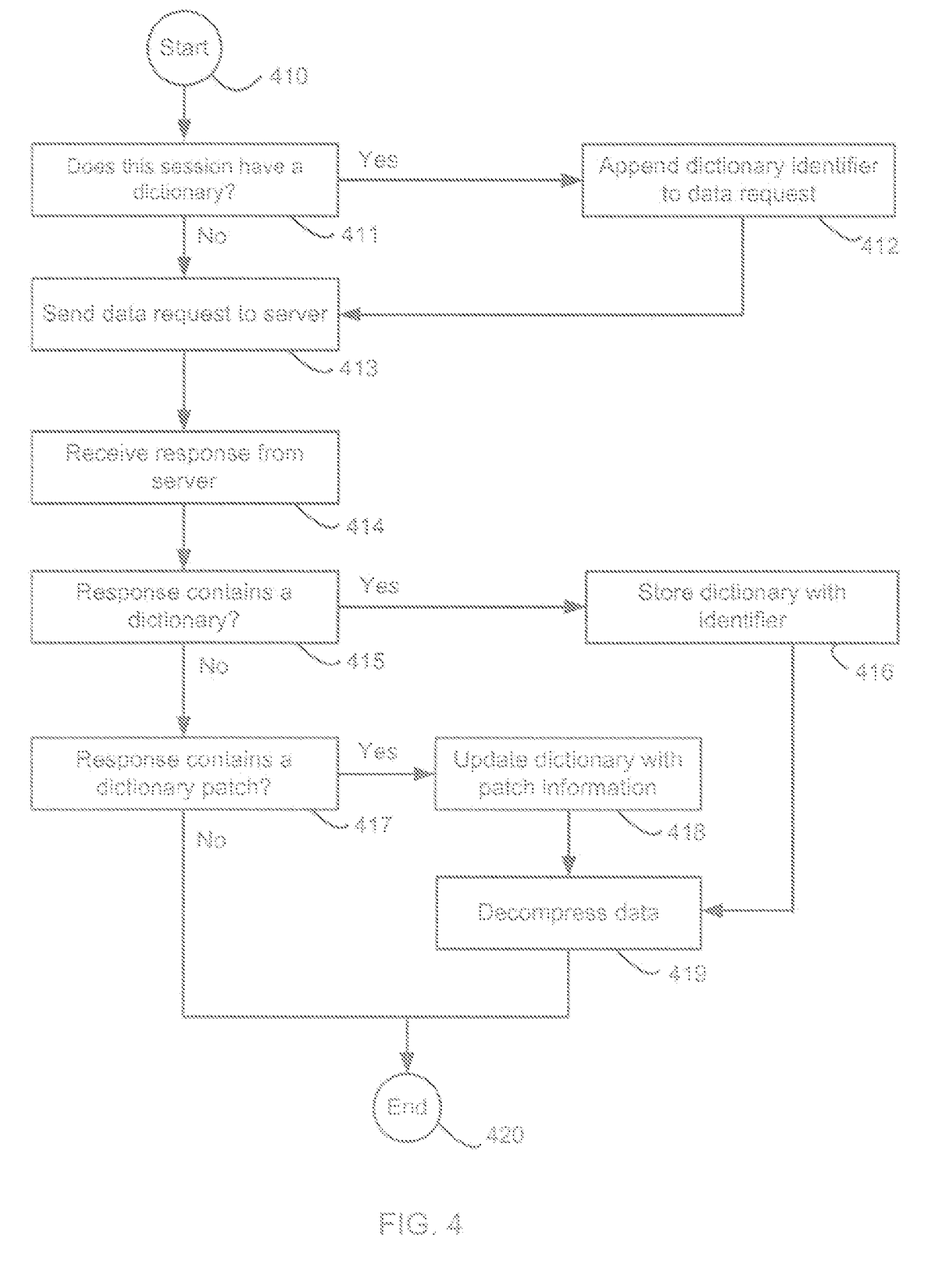
FIG. 4 is a flow chart representing a preferred method for processing a server response by the client where the response includes the compressed data and dictionary information returned by the server, according to aspects of the invention.

FIG. 4 is a flow chart representing the operations on a client's side of a preferred method for requesting data from a server and the client's processing of a response from the server, according to aspects of the invention. The client's operations start at block 410. At block 411, the client determines whether there is a dictionary being used for the current network session. If this is the initial data request from the client during this network session, then no dictionary has been returned by the server yet. The client next sends a data request to the server at block 413. If this is a subsequent request for data from the client during the current network session, then the client adds to the request the identifier of the dictionary that server referenced in its last response to the client, at block 412. The client next sends the data request to the server, with the dictionary qualifier, at block 413.

Once the server has processed the data request and sent back a response, the client receives the server's response at block 414. The client checks the response to see whether it includes a dictionary, at block 415. The response would include a new dictionary if the request was the initial request from the client in the current network session, or if the dictionary that the client had appended to its data request is no longer valid. If the response includes a dictionary, then the client stores the dictionary and the dictionary identifier in the client's memory, at block 416. The client then decodes (decompresses) the returned data using the dictionary, at block 419. The client's processing ends at block 420.

At block 415, if the client determines that the server's response does not contain a dictionary, then the client checks to see if the response includes a dictionary patch, at block 417. If so, the client updates the dictionary corresponding to the returned dictionary patch with information in the patch, at block 418. The client then decodes the returned compressed data using the updated dictionary at block 419. If the server's response does not include a dictionary patch, then the client's process terminates at block 420.

Figure 5:
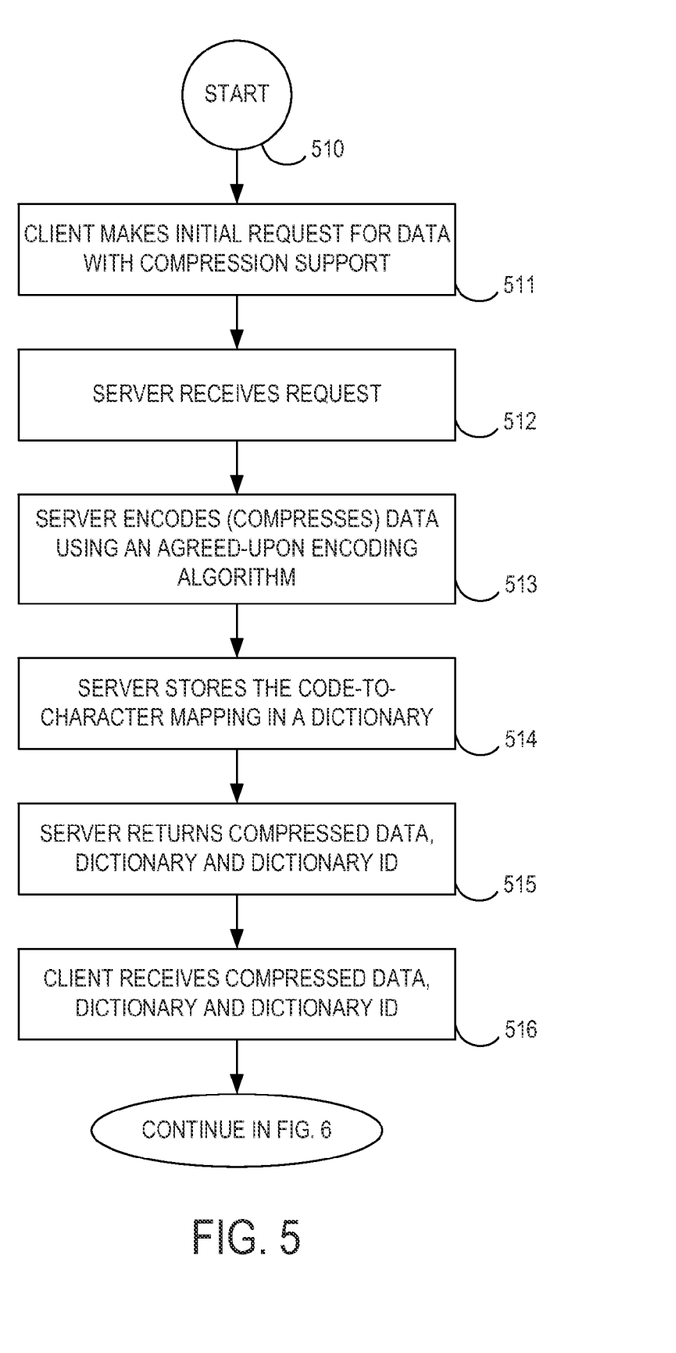
FIG. 5 is a flow chart representing a preferred method for network data compression between client and server computers based on dictionary updates according to aspects of the invention.

FIG. 5 is a flow chart representing a preferred process for network data compression between a client computer and a server computer based on dictionary updates, according to the invention. The process starts at block 510. At block 511, the client makes an initial request for data with encoding support (data compression) to the server. The request is received by the server at block 512. The server encodes the requested data at block 513, and stores the code-to-character mapping used to encode the data in a dictionary at block 514. The server then returns the compressed data, dictionary and an identifier for the dictionary to the client, at block 515. The dictionary identifier might be a unique identification created by the server or the network session ID number for the current session, if the network protocol between the server and client supports a network session ID number. The client receives the compressed data, the dictionary and the dictionary identifier at block 516. The process continues in FIG. 6.

Figure 6:
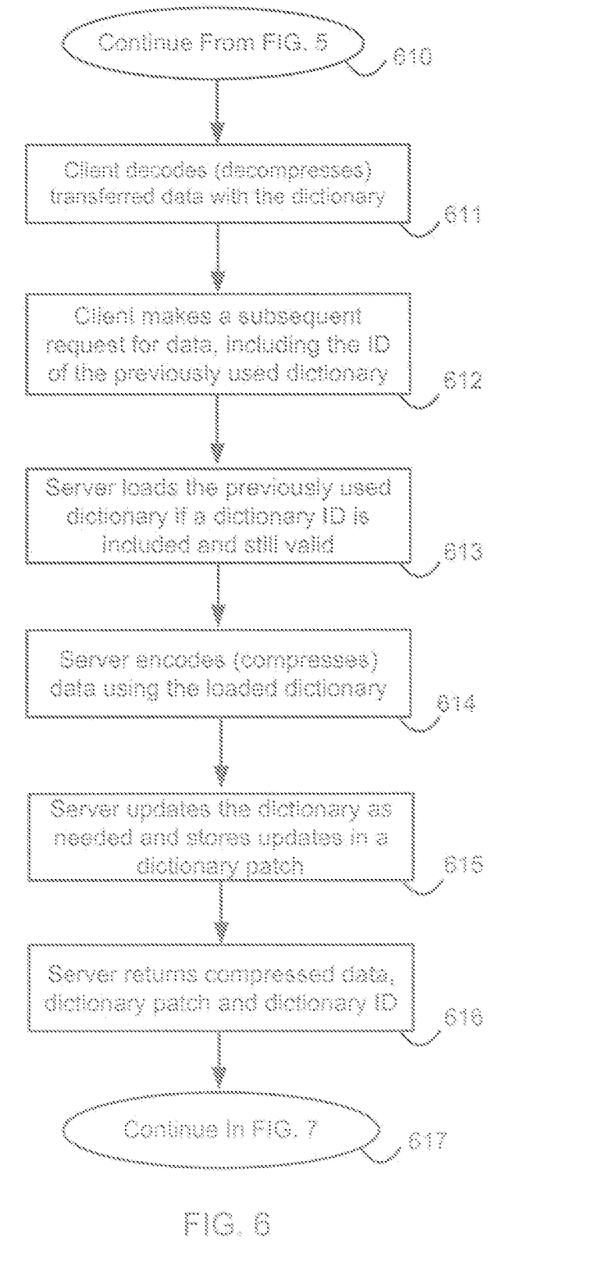
FIG. 6 is a flow chart that continues from the flow chart in FIG. 5, representing a preferred method for network data compression between client and server computers based on dictionary updates according to aspects of the invention.

Referring now to FIG. 6, the process from FIG. 5 continues at block 610. At block 611, the client decodes (decompresses) the data returned by the server with the returned dictionary. It also stores the dictionary and dictionary identifier in its memory for later use. If the client needs to request more data from the server, then it makes a subsequent request at block 612. The subsequent request also includes the dictionary identifier that was part of the server's last response if the identified dictionary is still valid based on it time stamp. Upon receiving the subsequent data request from the client, the server loads the dictionary into its memory at block 613 if a dictionary identifier was included in the client request and the dictionary is still valid. The validity of the dictionary might be based on a time stamp associated with the dictionary.

The server next encodes the requested data using the loaded dictionary at block 614. While encoding the data, the server also updates the dictionary as needed at block 615. The updating of the dictionary may include modifying a dictionary entry, adding a new entry or removing an existing entry. The server stores these updates in a dictionary patch. At block 616, the server returns the compressed data, the dictionary patch and the dictionary identifier to the client. The process continues in FIG. 7 at block 617.

Figure 7:
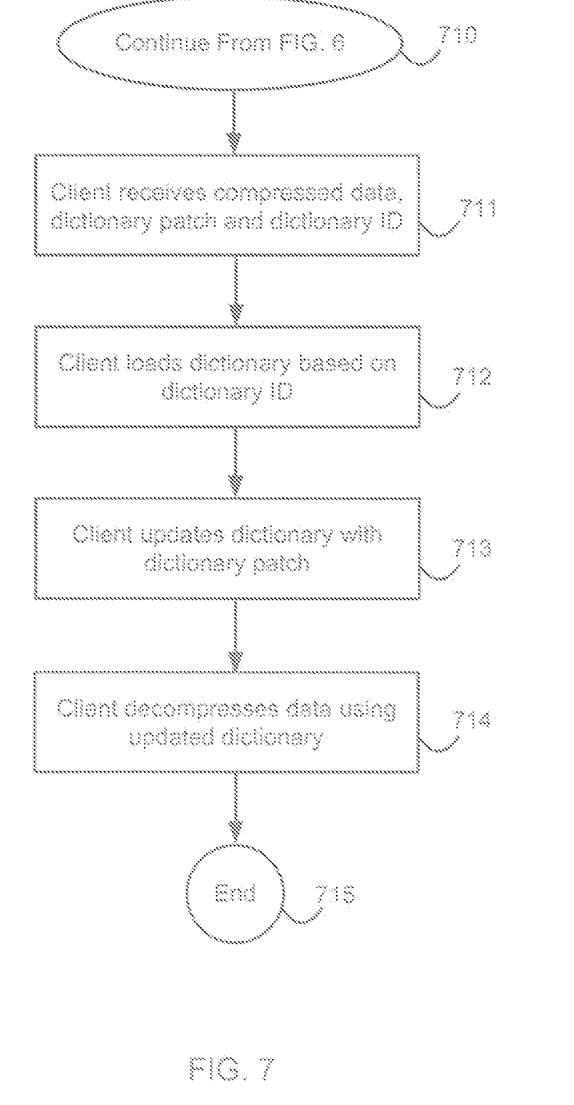
FIG. 7 is a flow chart that continues from the flow chart in FIG. 5, representing a preferred method for network data compression between client and server computers based on dictionary updates according to aspects of the invention.

Referring to FIG. 7, the client receives the compressed data, dictionary patch and dictionary identifier at block 711. The client next loads the dictionary into its memory using the dictionary identifier, at block 712. The client then updates the dictionary with information in the dictionary patch at block 713. At block 714, the client decompresses the returned data based on the updated dictionary. The client-server interaction process terminates at block 715.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for transport data compression between a server and a client, comprising the steps of:
    generating, by the server, a first compression dictionary for compressing a first chunk of data;
    compressing, by the server, the first chunk of data using the first compression dictionary to form a first compressed chunk of data;
    transmitting the first compressed chunk of data and the first compression dictionary from the server to the client, wherein the client decompresses the first compressed chunk of data using the first dictionary;
    generating, by the server, a second compression dictionary for compressing a second chunk of data;
    compressing, by the server, the second chunk of data using the second compression dictionary to form a second compressed chunk of data;
    generating, by the server, a dictionary patch based on the first compression dictionary and the second compression dictionary; and
    transmitting the second compressed chunk of data and the dictionary patch to the client, wherein the client updates the first compression dictionary using the dictionary patch to form the second compression dictionary and decompresses the second compressed chunk of data using the second compression dictionary.

2. The method of claim 1, wherein the dictionary patch includes updates to the first compression dictionary.

3. The method of claim 1, wherein the second compression dictionary is associated with a dictionary identifier.

4. The method of claim 3, wherein the server transmits the dictionary identifier to the client with the second compressed chunk of data and the dictionary patch.

5. The method of claim 3, wherein the dictionary identifier is a network session identification.

6. The method of claim 3, wherein is dictionary identifier is a unique ID created by the server.

7. The method of claim 1, further comprising:
    responsive to receiving from the client a request for a subsequent chunk of data without a compression dictionary identifier, generating a new compression dictionary;
    compressing the subsequent chunk of data using the new compression dictionary to form a subsequent compressed chunk of data; and
    transmitting the subsequent compressed chunk of data and the new compression dictionary from the server to the client.

8. The method of claim 7, wherein the server transmits a flag indicating that a new compression dictionary is included with the subsequent compressed chunk of data.

9. The method of claim 1, wherein the first compression dictionary has an associated expiration time and the client identifies the first compression dictionary in a request for the second chunk of data if the expiration time has not passed.

10. The method of claim 1, wherein the second compression dictionary has an expiration time and the server returns a new compression dictionary with a subsequent compressed chunk of data if the expiration time has passed.

11. The method of claim 1, wherein the server returns a new compression dictionary with a subsequent compressed chunk of data if the new compression dictionary is significantly different from a previously used compression dictionary.

12. The method of claim 1, wherein the client replaces a previously used compression dictionary with a new compression dictionary if the new compression dictionary is returned by the server.

13. The method of claim 1, wherein the server transmits a flag indicating that a dictionary patch is included with the second compressed chunk of data.

14. The method of claim 1, wherein each subsequent client data request includes a reference to a previously used compression dictionary if the previously used compression dictionary is still valid.

15. The method of claim 1, wherein the server compresses requested data based on an encoding algorithm agreed upon by the server and the client.

16. The method of claim 15, wherein the server stores a code-character mapping of the algorithm in a dictionary.

17. A server for transport data compression between the server and a client, comprising:
    a processor; and
    a memory coupled to the processor, wherein the memory comprises instructions which, when executed by the processor, cause the processor to:
    generate a first compression dictionary for compressing a first chunk of data;
    compress the first chunk of data using the first compression dictionary to form a first compressed chunk of data;
    transmit the first compressed chunk of data and the first compression dictionary to the client, wherein the client decompresses the first compressed chunk of data using the first dictionary;
    generate a second compression dictionary for compressing a second chunk of data;

compress the second chunk of data using the second compress or dictionary to form a second compressed chunk of data;

generate a dictionary patch based on the first compression dictionary and the second compression dictionary; and transmit the second compressed chunk of data and the dictionary patch to client, wherein the client updates the first compression dictionary using the dictionary patch to form the second compression dictionary and decompresses the second compressed chunk of data using the second compression dictionary.

18. The server of claim 17, wherein the dictionary patch includes updates to the first compression dictionary.

19. The server of claim 17, wherein the second compression dictionary is associated with a dictionary identifier and the server transmits the dictionary identifier to the client with the second compressed chunk of data and the dictionary patch.

20. A computer program product for transport data compression between a server and a client, the product comprising a computer readable storage device having a computer readable program stored in the storage device, wherein the computer readable program, when executed by the server, cause the server to: generate a first compression dictionary for comprising a first chunk of data; compress the first chunk of data using the first dictionary to form a first compressed chunk of data; transmit the first compress chunk of dam and the first compression dictionary to the client wherein the client decompresses the first compressed chunk of data using the first dictionary; generate a second compression dictionary for compress a second chunk of data; compress the second chunk of data 1Lsiag the second compression dictionary to form a second compressed chunk of data; generate a dictionary patch based on the first compression dictionary and the second compression dictionary; and transmit the second compressed chunk of data and the dictionary patch to the client, wherein the client update the first compression dictionary using the dictionary patch to form the second compression dictionary and decompresses the second compressed chunk of data using the second compression dictionary.

21. The computer program product of claim 20, wherein the dictionary patch includes updates to the first compression dictionary.

22. The computer program product of claim 20, wherein the second compression dictionary is associated with a dictionary identifier and the server transmits the dictionary identifier to the client with the second compressed chunk of data and the dictionary patch.

23. The computer program product of claim 20, wherein the second compression dictionary has an expiration time and wherein the computer readable program further causes the server to return a new compression dictionary with a subsequent compressed chunk of data if the expiration time has passed.

24. The computer program product of claim 20, wherein the computer readable program further causes the server to return a new compression dictionary with a subsequent compressed chunk of data if the new compression dictionary is significantly different from a previously used compression dictionary.

25. The computer program product of claim 20, wherein computer readable program further causes the server to transmit a flag indicating that a dictionary patch is included with the second compressed chunk of data.

* * * * *